(12) United States Patent
Köster

(10) Patent No.: US 12,472,783 B2
(45) Date of Patent: Nov. 18, 2025

(54) COUPLING SYSTEM

(71) Applicant: SAF-HOLLAND GmbH, Bessenbach (DE)

(72) Inventor: Mario Sebastian Köster, Bodman-Ludwigshafen (DE)

(73) Assignee: SAF-HOLLAND GmbH, Bessenbach (DE)

( * ) Notice: Subject to any disclaimer, the term of this patent is extended or adjusted under 35 U.S.C. 154(b) by 893 days.

(21) Appl. No.: 17/753,627

(22) PCT Filed: Sep. 9, 2020

(86) PCT No.: PCT/EP2020/075173
§ 371 (c)(1),
(2) Date: Mar. 9, 2022

(87) PCT Pub. No.: WO2021/048189
PCT Pub. Date: Mar. 18, 2021

(65) Prior Publication Data
US 2022/0332154 A1   Oct. 20, 2022

(30) Foreign Application Priority Data
Sep. 10, 2019   (DE) ...................... 10 2019 124 263.0

(51) Int. Cl.
*B60D 1/01* (2006.01)
*B60D 1/64* (2006.01)
*B62D 53/08* (2006.01)

(52) U.S. Cl.
CPC ............... *B60D 1/015* (2013.01); *B60D 1/64* (2013.01); *B62D 53/0807* (2013.01)

(58) Field of Classification Search
CPC . B60D 1/015; B60D 1/64; B60D 1/62; B62D 53/0807; B62D 53/0814; B62D 53/10
See application file for complete search history.

(56) References Cited

U.S. PATENT DOCUMENTS 6,302,424 B1 * 10/2001 Gisinger ................ B62D 53/08
280/433
9,616,943 B2 * 4/2017 Burchett .............. B62D 35/001
(Continued)

FOREIGN PATENT DOCUMENTS

| CN | 108437884 A | 8/2018 |
| CN | 106796729 B | 7/2020 |

(Continued)

OTHER PUBLICATIONS

European Patent Office, International Search Report; Nov. 12, 2020; entire document.

*Primary Examiner* — Valentin Neacsu
*Assistant Examiner* — Marlon A Arce
(74) *Attorney, Agent, or Firm* — Price Heneveld LLP

(57) ABSTRACT

A coupling system for a towing vehicle that includes at least one sensor, and a fifth wheel arrangement that includes a fifth wheel plate and at least one bearing block, wherein the fifth wheel plate has a trailer surface and an entry opening, wherein the trailer surface has an outwardly pointing normal, wherein the entry opening extends in an entry direction, wherein the fifth wheel plate is pivotably beard about a transverse axis relative to the bearing block, wherein the bearing block has a contact surface, wherein the contact surface lies in a contact plane, wherein the sensor indirectly and/or directly detects a pitch angle about the transverse axis contactlessly, and wherein the sensor is arranged in the immediate vicinity of the fifth wheel plate.

13 Claims, 2 Drawing Sheets

(56) References Cited

U.S. PATENT DOCUMENTS

| | | | |
|---|---|---|---|
| 2008/0036173 A1* | 2/2008 | Alguera | B62D 53/068 |
| | | | 296/180.3 |
| 2013/0082453 A1* | 4/2013 | Padula | B62D 53/08 |
| | | | 280/433 |
| 2017/0174019 A1* | 6/2017 | Lurie | B60D 1/015 |
| 2017/0334256 A1* | 11/2017 | Scheips | G01B 21/32 |
| 2021/0300136 A1* | 9/2021 | Algüera | B60D 1/64 |
| 2022/0332154 A1* | 10/2022 | Köster | B60D 1/64 |

FOREIGN PATENT DOCUMENTS

| | | |
|---|---|---|
| DE | 4021717 A1 | 1/1992 |
| DE | 69108639 | 5/1995 |
| DE | 4402526 C2 | 12/1998 |
| DE | 19752108 A1 | 5/1999 |
| DE | 69516088 | 5/2000 |
| DE | 60123687 T2 | 8/2007 |
| DE | 102004045662 B4 | 10/2008 |
| JP | 2015036267 A | 6/2017 |
| WO | 2004096623 A1 | 11/2004 |
| WO | 2015148438 A1 | 10/2015 |
| WO | 2019101847 A1 | 5/2019 |

\* cited by examiner

COUPLING SYSTEM

BACKGROUND OF THE INVENTION

The invention relates to a coupling system, in particular with a fifth wheel arrangement.

Fifth wheel arrangements are already known from the prior art and serve to be able to receive a king pin of a trailer and to be able to transmit forces from a towing vehicle to this king pin. These fifth wheel arrangements are usually designed in such a way that the fifth wheel plate of the fifth wheel arrangement can be pivoted about a transverse axis relative to the towing vehicle. The position angle of the fifth wheel plate about the transverse axis relative to the towing vehicle is also referred to in the trade as the pitch angle. Knowledge of this pitch angle can provide information about critical driving situations in particular. In order to determine the pitch angle, it is known at best to use measuring systems which are very space-intensive and prone to error.

It is therefore an object of the invention to specify a coupling system which is compact and enables the pitch angle of the fifth wheel plate to be measured in a simple manner.

SUMMARY OF THE INVENTION

According to the invention, a coupling system for a towing vehicle comprises at least one sensor, preferably a plurality of sensors, and a fifth-wheel coupling arrangement, the fifth-wheel coupling arrangement having a fifth-wheel coupling plate and at least one bearing or bearing arrangement, which is in particular a bearing block, the fifth-wheel coupling plate having a trailer surface and an entry opening, the trailer surface having an outwardly pointing normal, the entry opening extending in an entry direction, the fifth-wheel coupling plate being beard or supported such that it can be pivoted about a transverse axis relative to the bearing arrangement, the bearing arrangement having a contact surface, the contact surface lying in a contact plane, the sensor indirectly and/or directly sensing a pitch angle about the transverse axis contactlessly, and the sensor being arranged in the immediate vicinity of the fifth-wheel coupling plate. The coupling system according to the invention is intended to be arranged on a towing vehicle. The coupling system comprises at least one sensor, preferably a plurality of sensors, wherein this sensor, preferably all sensors, operate contactlessly A contactless sensor is characterised in particular by the fact that the sensor is able to contactlessly detect a measured value with a counter-surface or a measuring surface. For example, cameras, lasers or ultrasonic sensors are contactless sensor types in the sense of the invention, which can be arranged in the coupling system according to the invention. In addition to the contactless sensor, the coupling system also comprises a fifth wheel arrangement which has at least one fifth wheel plate and a bearing block or bearing. The fifth wheel plate has at least one trailer surface and an entry opening. The trailer surface of the fifth wheel plate serves to support a semi-trailer in a coupled state. In other words, the trailer surface can be the surface of the fifth wheel plate on which the semi-trailer rests in the coupled state. This trailer surface has an outward-pointing normal. A normal is outward-pointing if it points away from the relevant surface. Due to the fact that the trailer surface does not necessarily have to be completely flat, the relevant outward-facing normal of the trailer surface is the averaged normal over the entire trailer surface. In particular, this outwardly pointing normal of the trailer surface in an installed state or in the coupled state is aligned in such a way that it is directed against the vector of the acceleration due to gravity when travelling over an ideal flat surface. In other words, the trailer surface may be oriented parallel to the horizontal plane, particularly during ideal travel. In addition to the trailer surface, the fifth wheel plate also has an entry opening. The purpose of this entry opening is that a king pin can be inserted into it in order to achieve or enable coupling of a semi-trailer or a semi-trailer into the fifth-wheel coupling plate or the fifth-wheel coupling arrangement. The entry opening extends in the entry direction. The entry direction is in particular the direction in which the king pin of the semi-trailer must move in order to be able to be transferred from an uncoupled state to the coupled state. Alternatively or additionally preferred, the entry direction can also be the direction in which the fifth wheel arrangement moves during ideal straight-ahead travel. The engaged state is in particular the state in which the king pin of the semi-trailer has assumed its final position in relation to the fifth wheel plate. In this final position, tractive and transverse forces in particular can be transferred from the fifth wheel arrangement to the king pin. The coupled state is the state in which the semi-trailer is coupled to the towing vehicle via the fifth wheel arrangement in such a way that tractive and lateral forces can be transmitted between the trailer and the towing vehicle. The fifth wheel plate of the fifth wheel arrangement is beard in such a way that it can be pivoted about the transverse axis relative to the bearing block or bearing. The transverse axis is in particular the axis which is perpendicular to the entry direction and the outwardly pointing normal of the trailer surface. The bearing block or the bearing of the fifth wheel arrangement serves to support the fifth wheel arrangement with respect to a contact plane. For this purpose, the bearing block or the bearing has at least one contact surface. This contact surface is arranged or oriented in such a way that it lies in the contact plane. The pivotable bearing of the fifth wheel plate about the transverse direction in relation to the bearing block or in relation to the bearing ensures that a certain pivoting movement between the towing vehicle and the semi-trailer to be towed is possible, particularly on an uneven road. The torsion or the position of the pivoting movement or the rotational movement of the fifth wheel plate about the transverse axis is called the pitch angle. The contactless sensor of the coupling system is configured in such a way that it can indirectly and/or directly detect this pitch angle about the transverse axis contactlessly. For example, this can be done by measuring the distance of the trailer surface and/or the change in this distance relative to the contact plane. Alternatively or additionally preferably, such a measurement can also be carried out by the sensor interacting with a pole wheel, so that the pitch angle about the transverse axis can also be measured. In order to achieve a particularly compact, easy-to-mount and simple measurement method for the pitch angle, the sensor of the coupling system according to the invention is arranged in the immediate vicinity of the fifth wheel plate. The term "arranged in the immediate vicinity of the fifth wheel plate" is to be understood in this context as meaning that the at least one sensor, preferably all sensors, of the coupling system for contactless detection of the pitch angle are arranged at a maximum distance of 0.5 m, preferably at a maximum distance of 0.3 m, and particularly strongly preferably at a maximum distance of 0.2 m, from the fifth wheel plate. In this context, however, it should be noted that for the determination of whether a sensor is "arranged in the immediate vicinity of the fifth wheel plate"

or not, only those sensors of the coupling system are relevant which carry out or are intended to carry out a contactless measurement of the pitch angle.

Advantageously, the coupling system comprises a plurality of sensors, wherein the plurality of sensors indirectly and/or directly detect and/or determine a pitch angle about the transverse axis contactlessly. Due to the large number of sensors, a high redundancy and/or an increase in the measurement accuracy of the pitch angle can be achieved. Advantageously, the measured value of each individual sensor is therefore able to determine or indicate the pitch angle on its own. In other words, the coupling system can therefore comprise a plurality of pitch angle sensors. Alternatively or additionally preferred, some sensors can only determine or indicate the pitch angle in combination with other sensors.

Preferably, at least one sensor is arranged and/or fastened on the bearing, in particular on the bearing block, and/or wherein at least one sensor is arranged and/or fastened on the fifth wheel plate. In other words, preferably at least one sensor is mechanically fixed directly to the fifth wheel plate or to the bearing block or the bearing. In particular, a sensor is arranged and/or attached to the bearing block or the bearing or the fifth wheel plate if the sensor thereby performs all movements with the fifth wheel plate or with the bearing block or the bearing during a rotation and/or movement of the respective component. This can mean, for example, that if the relevant sensor is arranged and/or attached to the fifth wheel plate, the sensor will follow any pitching or translational movement with the fifth wheel plate. By arranging the sensor on the bearing bracket or on the support, a particularly simple cable routing and power supply for the sensor can be provided, so that costs can be saved as a result. By arranging the sensor on the fifth wheel plate can be achieved in particular that the sensor is protected against external influences. This applies to a particularly high degree if the sensor is arranged on a surface of the fifth wheel plate that is formed opposite the trailer surface in the direction of the outwardly pointing normal of the trailer surface.

Advantageously, at least one sensor is arranged on the transverse axis and/or at least one sensor is arranged in such a way that it is intersected by the transverse axis, the sensor being in particular an angle sensor. By arranging the sensor on the transverse axis or in such a way that the sensor is intersected by the transverse axis, a particularly compact measuring arrangement results. In addition, a direct and immediate measurement of the pitch angle can be carried out, resulting in a particularly reliable measurement. In this context, "intersection of the sensor by the transverse axis" means that the sensor is arranged in such a way that at least part of the volume occupied by the sensor is tangent to the transverse axis and/or is penetrated by the transverse axis—in its imaginary course. It should be noted, however, that the imaginary course of the transverse axis is already decisive for the penetration or tangent. The sensor can be designed in such a way that it is an angle sensor, so that the sensor can directly determine the pitch angle.

Advantageously, at least one sensor is an inductive and/or capacitive sensor. By using an inductive or capacitive sensor, the measurement of the pitch angle is particularly independent of contamination, because both capacitive and inductive sensors react particularly insensitively to contamination. It is particularly preferred that all sensors used to measure the pitch angle are inductive and/or capacitive sensors.

It is particularly preferred if all sensors of the pitch angle measurement system are interchangeable. This can be achieved, for example, by all sensors of the coupling system having the same design. In particular, this can increase the maintainability of the system, since a large number of different sensors do not have to be kept in stock.

Preferably, at least one sensor forms a measuring system with a pole wheel, wherein the pole wheel is rotationally rigid about the transverse axis relative to the fifth wheel plate and/or relative to the bearing, in particular relative to the bearing block. In other words, at least one sensor of the coupling system with a pole wheel can form a measuring system which is designed similarly to an ABS system in a brake. For this purpose, the pole wheel is connected in particular to the fifth wheel plate or the bearing block or the bearing, whereby at the same time the sensor can be arranged on the other component (bearing or bearing block or fifth wheel plate), so that the relative movement between sensor and pole wheel about the transverse axis can be detected in a simple manner. This results in a particularly reliable angle measurement sensor or angle measurement system. Advantageously, the sensor and/or the pole wheel are arranged in such a way that they form at least one distal end of the fifth wheel arrangement or the coupling system in the direction of the transverse axis. In other words, this can mean that the pole wheel and/or the sensor are arranged on the very outside in the direction of the transverse axis. This can in particular increase the maintainability and/or reduce the assembly effort.

Advantageously, at least one sensor determines a distance of the trailer surface to the contact plane in the direction of a normal of the contact plane. The relevant normal of the contact plane is the normal of the contact plane which points in the direction of the fifth wheel plate. For example, this normal can be parallel to the outward pointing normal of the trailer surface of the fifth wheel plate, in particular if the pitch angle about the transverse axis is 0°. By determining the distance of the trailer surface to the contact plane, the pitch angle can easily be determined indirectly—knowing the distance of the sensor to the transverse axis, especially in the entry direction. In this context, however, it should be pointed out that this distance determination between the trailer surface and the contact plane does not have to be carried out directly. Rather, this measurement can also be carried out indirectly. This is the case, for example, if the sensor and the measuring surface used have a defined and known distance to the trailer surface or to the contact plane. In other words, this distance measurement in the direction of the normal of the contact plane can be carried out indirectly by determining the distance between a surface of the fifth wheel plate and a surface of the bearing block or the bearing, whereby the distance of these surfaces to the trailer surface or to the contact plane is known. For example, a sensor can be arranged on the bearing block, which interacts metrologically with a measuring surface of the fifth wheel plate, whereby the measuring surface is arranged in particular below the trailer surface and whereby the distance of the sensor to the contact plane and the distance of the measuring surface to the trailer surface are known in each case. Advantageously, the sensor that is decisive for determining the distance is arranged in such a way that it measures the distance in a measuring direction that is essentially parallel to the outwardly pointing normal of the contact surface. A measuring direction is essentially parallel to the normal of the contact plane in particular if the maximum angle formed between the normal and the measuring direction corresponds to the maximum possible pitch angle of the fifth wheel plate about the transverse axis. Advantageously, the measuring direction of the sensor is oriented in such a way that it is parallel to the normal of the contact plane or parallel to the outward-pointing normal of the trailer surface—regardless of the size of the pitch angle. This makes it possible to determine the pitch angle with a particularly low level of measurement error. In this context, it is understood that a plurality of sensors can also be present in the coupling system, which can metrologically record the distance between the contact plane and the trailer surface independently of each other. This increases the redundancy of the measurement in particular.

In an advantageous further development, at least two sensors determine a distance of the trailer surface to the contact plane in the direction of the normal of the contact plane, whereby preferably one sensor is arranged in front of the transverse axis in the entry direction and the other sensor is arranged behind the transverse axis in the entry direction. By using at least two sensors for distance measurement, it is possible to achieve a particularly reliable pitch angle measurement. By arranging one sensor in front of the transverse axis and one sensor behind the transverse axis—in the direction of the entry direction—it can be achieved that the direction of the pitching movement (positive pitching movement or negative pitching movement) can be determined particularly easily and reliably by comparing these two sensors. This identification of the direction of the sign can be used in particular as a further redundancy criterion for the measurement, so that the measurement accuracy or the reliability of the measurement can be increased by this type of arrangement of the measurement sensors.

In a preferred embodiment, the at least two sensors have the same distance to the transverse axis in the entry direction. In other words, this can mean that the sensors have the same distance to the transverse axis in the entry direction. This equal spacing of the sensors makes it possible to easily and effectively determine measurement errors by observing the differences.

Advantageously, a sensor determines a distance of the trailer surface to the contact plane in the direction of the normal of the contact plane, whereby the sensor for this purpose metrologically interacts with a measuring surface of the fifth wheel plate, whereby this measuring surface is designed opposite the trailer surface. In other words, this can mean that the sensor for determining the distance interacts metrologically with a measuring surface of the fifth wheel plate, which is arranged below the trailer surface. This measuring surface can therefore be designed in such a way that it has an outward-pointing normal, which points in the direction of the contact plane. By forming a measuring surface below the trailer surface can be achieved that this measuring surface is particularly protected against contamination and/or mechanical influence. Alternatively or additionally preferred, the measuring system can also be designed in such a way that the measuring sensor is arranged on a surface of the fifth wheel plate which is designed opposite the trailer surface, whereby the measuring surface with which the sensor interacts is arranged on the bearing block or the bearing or forms a part of the bearing block or the bearing. This allows the sensor to be mounted in such a way that it is resistant to mechanical influences and/or contamination.

Advantageously, the fifth wheel plate is non-displaceable in relation to the bearing, in particular in relation to the bearing block, especially in the direction of the normal of the contact plane and/or the transverse direction and/or the normal of the trailer surface. In this way, a particularly safe support of the fifth wheel plate can be achieved. In this context, "non-displaceable" means that a translational movement is prevented, so that a rotational movement is or can still be possible.

Another aspect of the invention may relate to a commercial vehicle comprising a coupling system as described above.

BRIEF DESCRIPTION OF THE DRAWINGS

Further advantages and features of the present invention can be seen in the following description with reference to the figures. Individual features of the embodiments shown can also be used in other embodiments unless this has been expressly excluded. It shows.

DETAILED DESCRIPTION OF THE PREFERRED EMBODIMENTS

Figure 1:
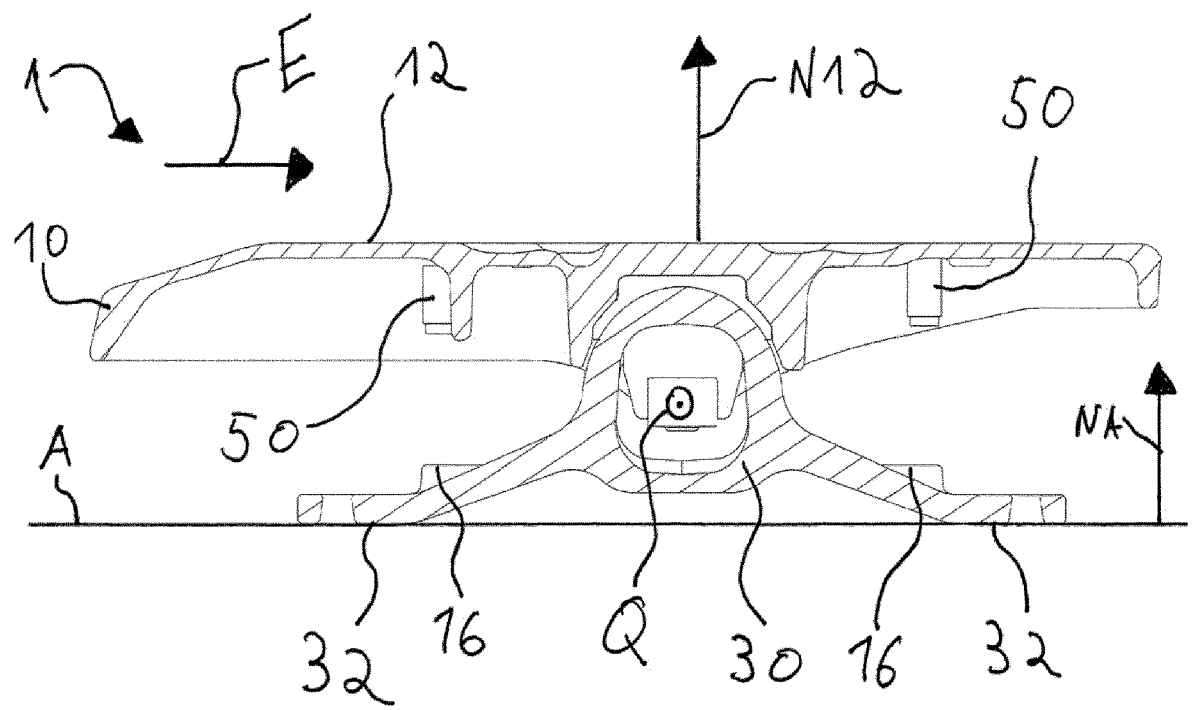
FIG. 1 a sectional view through a coupling system.

FIG. 1 shows a coupling system 1 which comprises a fifth wheel plate 10 and a bearing block 30 as well as at least one sensor 50. The fifth wheel plate 10 is beard about the transverse axis Q relative to the bearing block 30. The bearing block 30 has two contact surfaces 32, which are located in the contact plane A. The bearing block 30 has two measuring surfaces 16, which are arranged in front of and behind the transverse axis Q in the entry direction E, respectively. These measuring surfaces 16 have an outwardly pointing normal, which is parallel to the normal of the contact plane NA and/or to the outwardly pointing normal N12 of the trailer surface 12. A sensor 50 interacts metrologically with each of these measuring surfaces 16. In the embodiment shown, the measuring sensors 50 are arranged in such a way that they are arranged on a surface of the fifth wheel plate 10 located opposite the trailer surface 12. Alternatively or additionally preferred, these measuring systems (sensor 50 and the measuring surface 16) can also be designed in such a way that the sensor 50 of the measuring system is arranged on the bearing block 30 and the measuring surface 16 is a surface of the fifth wheel plate 10. In other words, at least one of the measuring systems can therefore be designed in such a way that the sensor 50 and the measuring surface 16 are interchanged with respect to the embodiment shown in the figure. The trailer surface 12 of the fifth-wheel coupling plate 10 has an outwardly pointing normal N12. In the ideal position, in which the pitch angle about the transverse axis Q is, for example, 0°, as shown in FIG. 1, the outward-facing normal N12 of the trailer surface 12 is aligned parallel to the normal NA of the contact plane A. In the ideal position, these two normals are perpendicular to the entry direction E and perpendicular to the transverse axis Q. In particular, the outward-pointing normal N12 of the trailer surface 12, the entry direction E and the transverse axis Q can form a right-handed coordinate system (not only in the ideal position).

Figure 2:
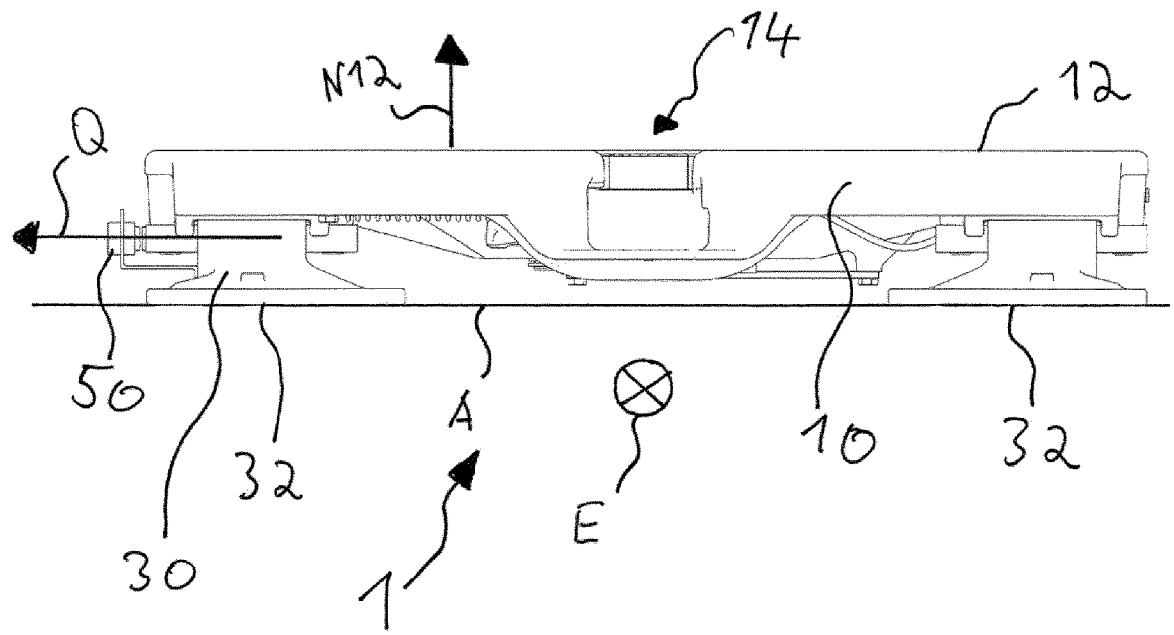
FIG. 2 a rear view of a coupling system.

FIG. 2 shows a rear view in the entry direction E of the coupling system 1. The fifth wheel plate 10 has a trailer surface 12 as well as an entry opening 14, whereby this entry opening 14 extends in the direction of the entry direction E. The fifth wheel plate 10 is beard via the bearing block 30 so as to be pivotable about the transverse axis Q relative to the contact plane A. In order to be able to detect the pitch angle about the transverse axis Q contactlessly, the coupling system 1 has an angle sensor 50 which is arranged in such a way that it is intersected by the transverse axis Q.

Figure 3:
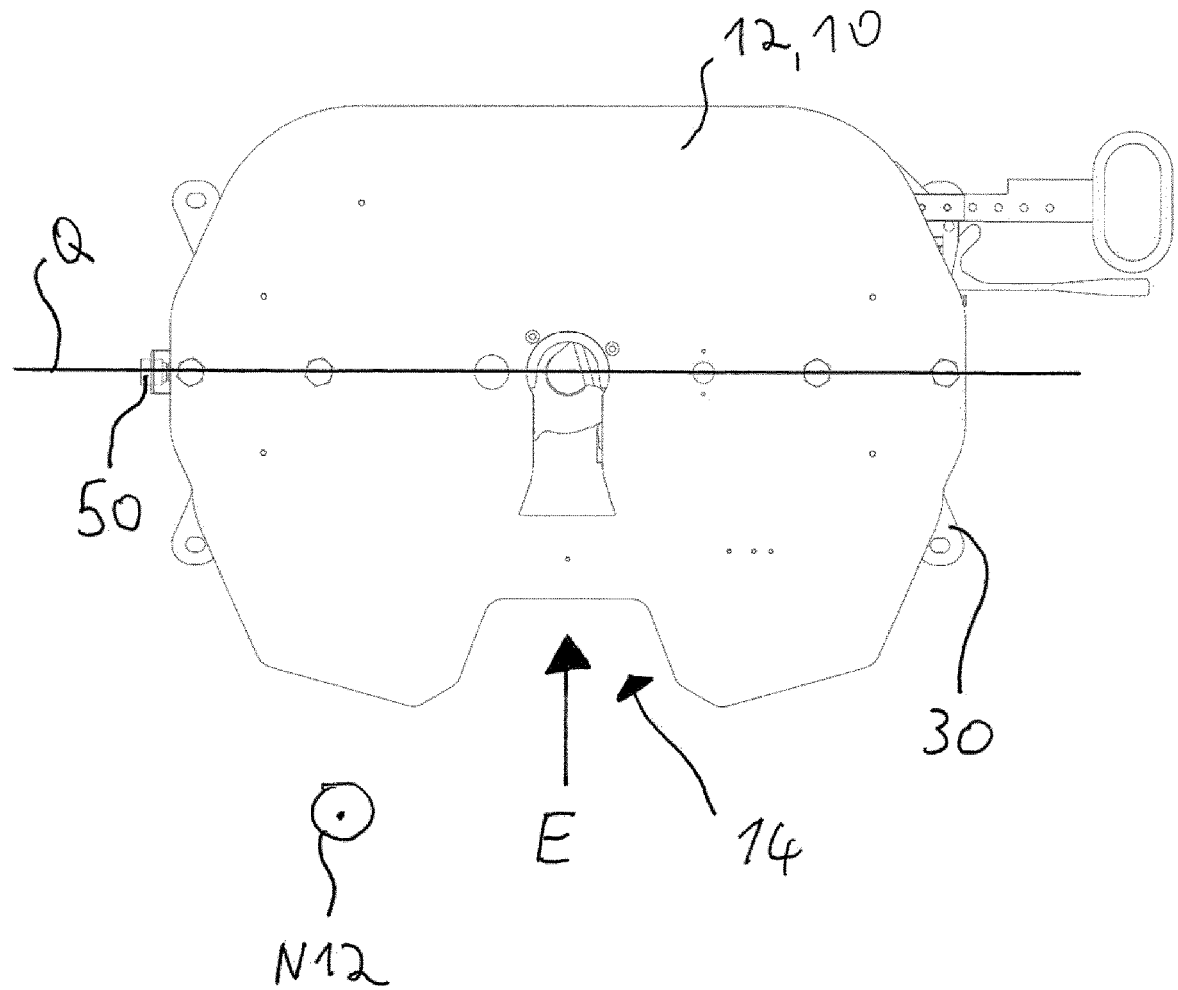
FIG. 3 a top view of a coupling system.

FIG. 3 shows a further embodiment of the coupling system 1 according to the invention. FIG. 3 shows a view against the outwardly pointing normal N12 of the trailer surface 12. The fifth wheel plate 10 has a retraction opening 14 which is formed between the two fifth wheel horns of the fifth wheel plate 10 and extends in the entry direction E. The fifth wheel plate 10 has a trailer surface 12 which, in a coupled state, serves to support a semi-trailer. The fifth wheel plate 10 is indirectly or directly beard so that it can pivot about the transverse axis Q in relation to the bearing block 30. The bearing blocks 30 of the coupling system 1 are the only supporting elements of the coupling system 1 in the embodiment shown. In order to be able to determine the pitch angle about the transverse axis Q, the coupling system 1 shown in FIG. 3 has a sensor 50, which is designed as an angle sensor.

REFERENCE LIST

1—Coupling system
10—Fifth wheel plate
12—Trailer surface
14—Entry opening
16—Measuring surface
30—bearing block
32—contact surface
50—Sensor
A—Contact plane
E—entry direction
N12—outward pointing normal of the trailer surface
NA—normal of the contact plane
Q—transverse axis

The invention claimed is:

1. A coupling system for a towing vehicle, comprising:
a plurality of sensors; and
a fifth wheel arrangement;
wherein the fifth wheel arrangement includes a fifth wheel plate and at least one bearing that includes a bearing block;
wherein the fifth wheel plate has a trailer surface and an entry opening;
wherein the trailer surface has an outwardly pointing normal;
wherein the entry opening extends in an entry direction;
wherein the fifth wheel plate is pivotally supported about a transverse axis relative to the at least one bearing;
wherein the bearing has a contact surface, the contact surface lying in a contact plane;
wherein the plurality of sensors indirectly and/or directly detect and/or determine a pitch angle about the transverse axis contactlessly;
wherein at least one of the plurality of sensors is disposed in close proximity to the fifth wheel plate; and
wherein at least one sensor of the plurality of sensors determines a distance of the trailer surface to the contact plane in the direction of a normal of the contact plane.

2. The coupling system according to claim 1, wherein at least one sensor of the plurality of sensors is arranged and/or fastened on the bearing block.

3. The coupling system according to claim 1, wherein at least one sensor of the plurality of sensors is arranged and/or attached to the fifth wheel plate.

4. The coupling system according to claim 1, wherein at least one sensor of the plurality of sensors is arranged on the transverse axis, and includes an angle sensor.

5. The coupling system according to claim 1, wherein at least one sensor of the plurality of sensors is arranged to be intersected by the transverse axis and includes an angle sensor.

6. The coupling system according to claim 1, wherein at least one sensor of the plurality of sensors includes an inductive and/or capacitive sensor.

7. The coupling system according to claim 1, wherein all sensors of the plurality of sensors are interchangeable with each other.

8. The coupling system according to claim 1, wherein at least one sensor of the plurality of sensors forms a measuring system with a pole wheel, the pole wheel being rotationally rigid about the transverse axis relative to the fifth wheel plate and/or relative to the bearing block.

9. The coupling system according to claim 1, wherein at least two sensors of the plurality of sensors are configured to determine a distance of the trailer surface to the contact plane in the direction of a normal of the contact plane, wherein one sensor of the at least two sensors is arranged in front of the transverse axis in the entry direction and another sensor of the at least two sensors is arranged behind the transverse axis in the entry direction.

10. The coupling system according to claim 9, wherein the at least two sensors have the same distance to the transverse axis in the direction of the entry direction.

11. The coupling system according to claim 1, wherein at least one sensor of the plurality of sensors is configured to determine a distance of the trailer surface to the contact plane in the direction of the normal of the contact plane, and metrologically interacts with a measuring surface of the fifth wheel plate, wherein the measuring surface is formed opposite the trailer surface.

12. The coupling system according to claim 1, wherein the fifth wheel plate is non-displaceable relative to the bearing block in the direction of the normal of the contact plane and/or the transverse direction and/or the normal of the trailer surface.

13. A commercial vehicle comprising a coupling system according to claim 1.

* * * * *